United States Patent [19]

Kahm

[11] 4,042,684

[45] Aug. 16, 1977

[54] DIETETIC BEVERAGE

[76] Inventor: Annika Britt Kahm, 930 Fifth Ave No. 4F, New York, N.Y. 10021

[21] Appl. No.: 669,564

[22] Filed: Mar. 23, 1976

[51] Int. Cl.$^2$ .......................... A23L 2/00; A61K 27/00
[52] U.S. Cl. ..................................... 424/153; 426/74; 426/590
[58] Field of Search .................... 426/74, 590, 599; 424/149, 153, 176, 180

[56] References Cited

U.S. PATENT DOCUMENTS

| | | | |
|---|---|---|---|
| 2,224,252 | 12/1940 | Callaway | 426/590 |
| 3,657,424 | 4/1972 | Aktins et al. | 426/74 X |
| 3,877,358 | 4/1975 | Karr | 426/590 X |

OTHER PUBLICATIONS

Winton; A. L. et al., "The Structure and Composition of Foods," John Wiley & Sons, Inc., New York, 1935, p. 694.

Hackh's "Chemical Dictionary" McGraw Hill Book Co., 1969, pp. 282 and 300.

*Primary Examiner*—Raymond N. Jones
*Assistant Examiner*—R. A. Yoncoskie
*Attorney, Agent, or Firm*—John J. Byrne

[57] ABSTRACT

A beverage for supplementing the dietetic requirements of sugar and essential salts in a mammalian body depletable through vigorous physical activity, whereby the level of available utilizable energy stores within the body are enhanced, comprising an aqueous solution of sugar, sodium chloride, potassium chloride, and free citric acid in precise compositional ranges.

3 Claims, No Drawings

DIETETIC BEVERAGE

BACKGROUND OF THE INVENTION

The present invention relates to a dietetic beverage for supplementing the requirements of sugar and essential salts in a mammalian body and, more especially, to those requirements in a human body where such components have been depleted through vigorous physical activity.

It is well known that increased physical exertion, particularly in hot and/or humid environments, significantly reduces the level of various essential salts through, most notably, perspiration. Significantly, also, maintenance of such activity and the level of individual endurance is tied intimately with the stored energy within the body, supplied primarily by sugars. These sugars, whence there is derived necessary energy for cellular activities, are commonly supplied to the body in the form of carbohydrates and the like which are subsequently metabolized by enzymes and acids in the digestive tract. However, the process is of rather long duration and, accordingly, immediate needs for energy may not be adequately satisfied thereby.

In order to supplement the naturally-occurring processes of the body in converting food to fuel, there have been developed various dietetic beverages capable of supplying or enhancing the level of innate sources of energy. Predominantly, these beverages have been extended citrus juices or derivatives thereof to which various salts have been added. Certain problems, however, are presented by this approach. Most notably, storage capabilities of natural citrus juice drinks are not particularly long and, consequently, various preservatives must be incorporated therein. Also, the addition of salts affects acidity and palatability of these beverages.

Certain endeavors at the formulation of entirely synthetic solutions have not been altogether successful. Moreover, it has been determined that some synthetic formulations may be highly detrimental to individuals with certain physical disorders.

Accordingly, the need exists to provide a dietetic beverage capable of supplementing both necessary sugars and essential salts in a mammalian body which are depletable through vigorous physical activity.

SUMMARY OF THE INVENTION

In accordance with the deficiencies of the prior art, it is a major object of the present invention to provide a beverage for supplementing the dietetic requirements of sugar and essential salts in a mammalian body depletable through vigorous physical activity, whereby the level of available, utilizable energy stores within the body are enhanced.

It is yet another object of the present invention to provide a beverage for supplementing the dietetic requirements of sugar and essential salts in a palatable and highly efficient form.

Yet a further object of the present invention is to provide such a dietetic beverage which may be stored for extended periods of time without the need to provide preservative agents.

Still a further object of the present invention is to provide a dietetic beverage for supplementing the requirements of sugar and essential salts, which comprises an aqueous solution of sugar, sodium chloride, potassium chloride, and free citric acid.

In accordance with the present invention, it has now been determined that the above and other objects and advantages may be realized by formulating an aqueous solution wherein the above-enumerated constituents are provided in specific, essential ranges. Broadly, the present invention envisions a composition comprising:

TABLE I

| | |
|---|---|
| Sugar | 2.0–3.5% |
| Sodium Chloride | 0.16–0.33% |
| Potassium Chloride | 0.03–0.13% |
| Free Citric Acid | 0.026–0.26% |
| Water | balance |

Furthermore, it has been found that a precise sugar composition is necessary to yield the foregoing objects and advantages, that composition being:

TABLE II

| | |
|---|---|
| Fructose | 0.4–0.7% |
| Glucose | 1.6–2.8% |

Yet further objects and advantages of the present invention will become apparent to the skilled artisan upon examination of the following detailed description of the invention.

DETAILED DESCRIPTION OF THE INVENTION

The present invention relates to a beverage of precise composition for supplementing the dietetic requirements of sugar and essential salts in a mammalian body and, especially, a human body, where these components are depletable through vigorous physical activity. For example, an athlete engaged in strenuous activity requires a ready source of energy for endurance, and replacement of both body fluids and essential salts lost through perspiration. Likewise, individuals working in a hot, humid atmosphere have similar requirements to maintain efficiency and productivity.

Typical diets provide intake of sugars and sugar-precursor materials such as carbohydrates. When metabolized in the digestive tract, fuel values are obtained through enzyme and acid attack therein. However, the process, as a naturally occurring one, requires time to achieve these ends. Moreover, increased momentary demands will far exceed the steady-state ability of this natural metabolic process.

Similarly, normal diets provide a measure of essential body salts including sodium, potassium and chloride ions. However, strenuous activity may well result in an expulsion of these salts through perspiration at a level exceeding intake.

The dietetic beverage of the present invention provides a supplementary source of both sugar and essential salts, as well as a replenishment of body fluid. The sugar components are selected to provide necessary fuel or energy, both for immediate and longer-lasting requirements, while the salt components provide the optimum balance thereof.

The sugar of the present beverage is comprised of a combination of fructose and glucose to achieve an energy store capable of providing needed fuel values as the demand thereof may vary. Each of these sugars is an energy food fully utilizable by cells of the body, each of the glucose and fructose sugars acting in a particular manner during protracted physical exertion. For example, glucose is easily and rapidly transported out of the digestive system into the blood whereas fructose is more passively and slowly transported. Once into circulation, the fructose is somewhat more efficient insofar as initial transport requires less energy and subsequent utilization for energy proceeds more readily. Thus, both immediate and longer lasting benefits are attainable.

The salt constituents of sodium chloride and potassium chloride are similarly provided in specific relationship. The quantity and relative proportion of the salts are provided to achieve an isotonic liquid without a strong acid taste. Thus, the salt components provide replacement for those essential ions lost in perspiration while, at the same time, yielding a highly palatable beverage in combination with the free citric acid.

Certain specific ranges have been found to be essential in order that the beverage of the present invention successfully provides the various objects and advantages. The sugar ingredient must be present within the range of from about 2 to about 3.5%, where fructose accounts for from about 0.4 to about 0.7% and glucose is present from about 1.6 to about 2.8%. Sodium chloride is added within the range of from about 0.16 to about 0.33%, while potassium chloride is added within the range of from about 0.03 to about 0.13%. Additionally, free citric acid is added within the range of from about 0.026 to about 0.26%, while water accounts for the balance of 100%.

The beverage of the present invention may be compounded with water and suitably bottled and stored. Alternatively, all of the components, save for water, may be prepared in advance as a concentrate for ease of handling and transportation. Also, the beverage may be prepared with carbonated water should such be desirable.

During athletic competition, or other strenuous physical activity, the individual may replace lost body fluids and essential salts while sustaining a high level of energy through consumption of the beverage of the present invention. Moreover, contrary to many of the prior art formulations for such beverages, e.g., extended citrus juices, intake of the beverage of the present invention is not accompanied by a "full" feeling which would present a serious hindrance in athletic competition. Thus, the present dietetic beverage successfully replaces and/or maintains individual body requirements in accordance with the physiological needs thereof and further provides storage of energy which may be "tapped" on demand.

While the invention has now been described in terms of a preferred embodiment of compositional ranges, the skilled artisan will appreciate that various substitutions, modifications, changes, and omissions may be made without departing from the spirit thereof. Accordingly, it is intended that the invention be limited solely by the scope of the following claims.

What is claimed is:

1. Beverage for supplementing the dietetic requirements of sugars and essential salts in a mammalian body depletable through vigorous physical activity, thereby enhancing the level of available, utilizable energy stores within the body, comprising the composition by weight:

| | |
|---|---|
| Fructose | 0.4–0.7% |
| Glucose | 1.6–2.8% |
| Sodium Chloride | 0.16–0.33% |
| Potassium Chloride | 0.03–0.13% |
| Free Citric Acid | 0.026–0.26% |
| Water | balance. |

2. The beverage of claim 1, wherein the water is carbonated water.

3. A dry beverage concentrate for supplementing the dietetic requirements of sugars and essential salts in a mammalian body depletable through vigorous physical activity, thereby enhancing the level of available, utilizable energy stores within the body, comprising the composition by weight in water: fructose 0.4–0.7%, glucose 1.6–2.8%, sodium chloride 0.16–0.22%, potassium chloride 0.03–0.13%, and free citric acid 0.026–0.26%, said concentrate suitable for addition to water to yield a beverage.

* * * * *